UNITED STATES PATENT OFFICE.

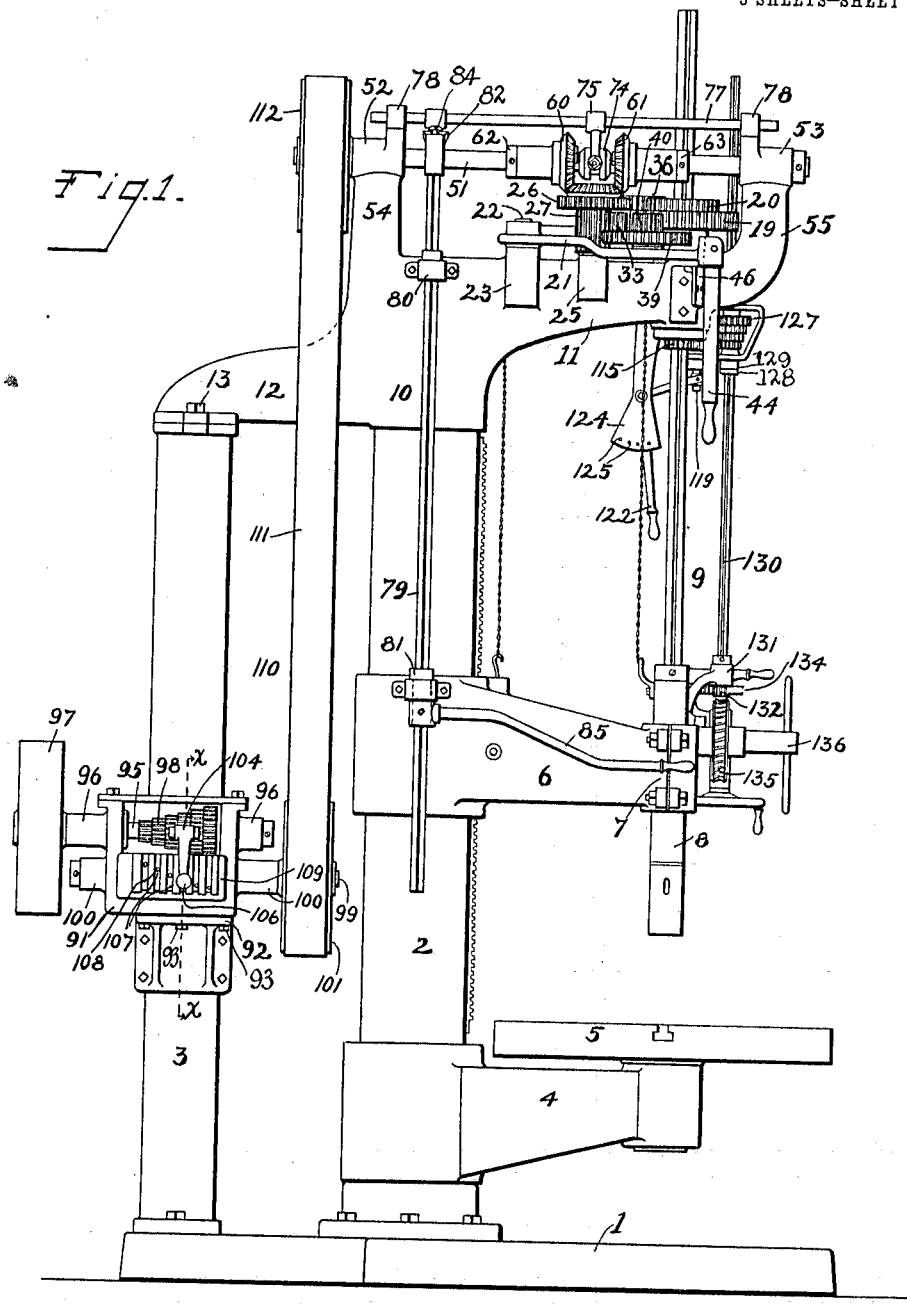

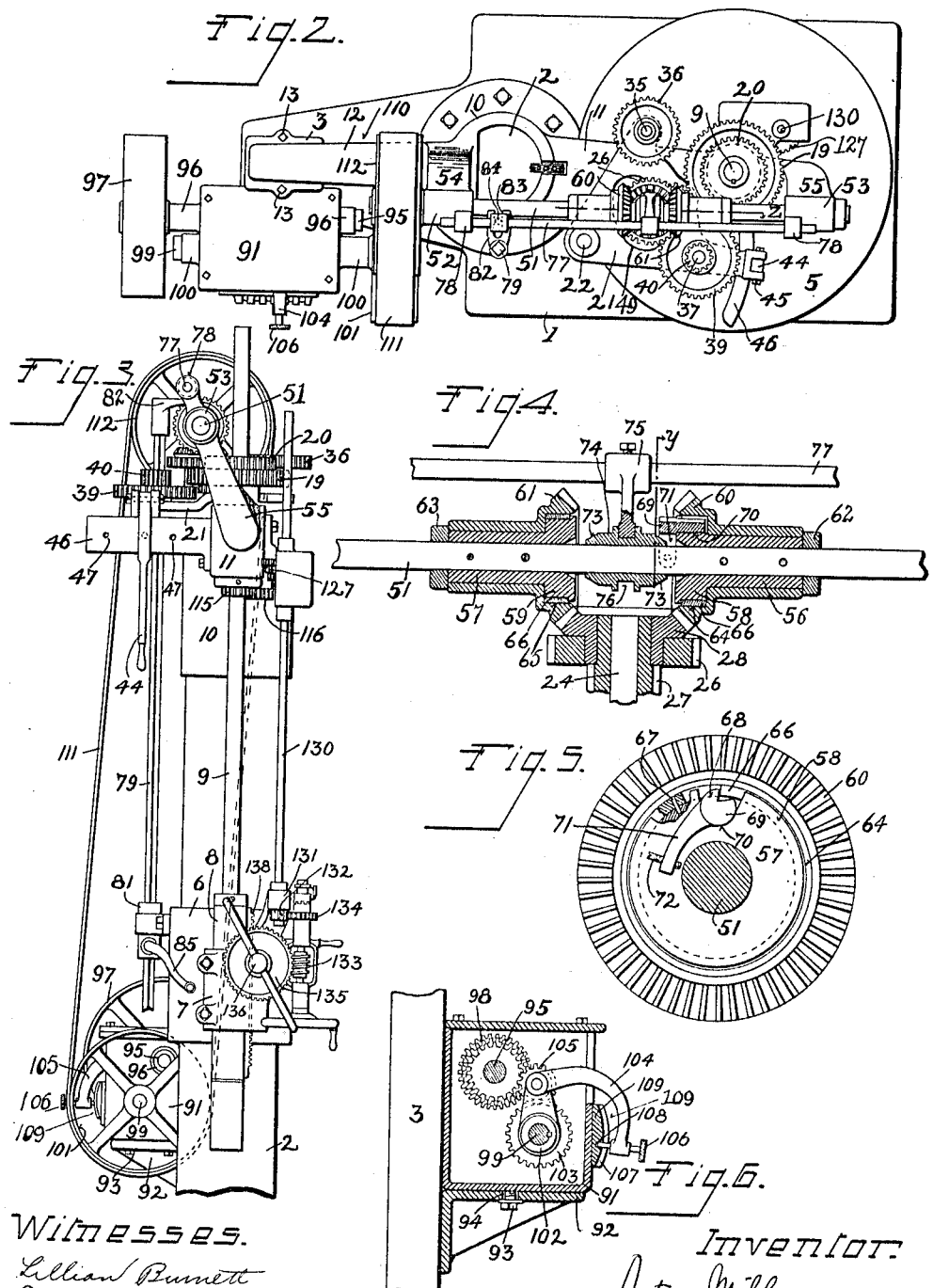

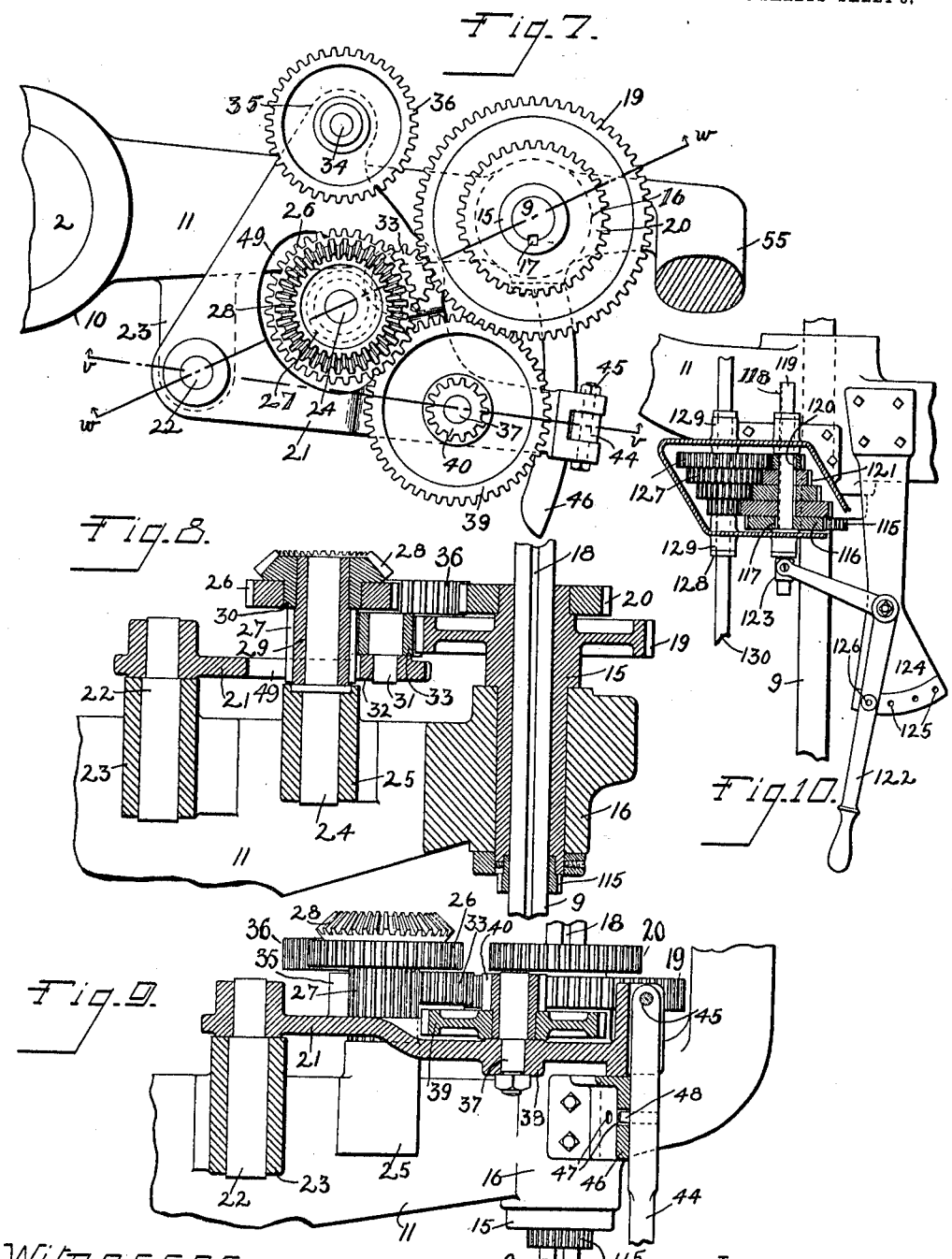

ANTON MILL, OF CINCINNATI, OHIO, ASSIGNOR TO THE HILBERT MACHINE COMPANY, OF CINCINNATI, OHIO, A CORPORATION OF OHIO.

GEARING.

1,053,625.

Specification of Letters Patent. Patented Feb. 18, 1913.

Application filed March 14, 1910. Serial No. 549,275.

*To all whom it may concern:*

Be it known that I, ANTON MILL, a citizen of the United States, residing at Cincinnati, in the county of Hamilton and State of Ohio, have invented certain new and useful Improvements in Gearing, of which the following is a specification.

In upright drills it is desirable to impart various speeds to the drill-spindle, and where the spindle is intended for tapping purposes it is also necessary to reverse the direction of rotation of the spindle so as to back the tool out of the hole being tapped.

It is the object of my invention to provide gearing for an upright drill especially adapted for heavy duty; to provide such a drill with spur-gearing at the spindle for driving the same and imparting the material reductions in speed through said spur-gearing, and I have employed novel means for accomplishing this; to employ a reversing clutch-mechanism in advance of said spur-gearing, whereby the clutch-mechanism operates under relatively high speed and under the necessity of transmitting but relatively little power per revolution for greatest efficiency in the clutches at the drilling tool; and to rotate the reversing shaft by means of a belt receiving its power from a speed-box, from which the primary variations of speed are thus imparted to the reversing shaft by means of a driving connection capable of slipping to prevent breaking strain on the following positively driven trains of gearing, the spindle feed being driven from the spindle however so that positive relation of speed of rotation and feed of the spindle may be maintained.

Instancing my objects in the present exemplification of my invention it may be assumed that the driven shaft of the speed-box at its greatest speed may make 250 revolutions per minute, which speed is transmitted to the reversing shaft and imparted to the spindle through one of the relations of spur-gearing at said spindle. By another relation of this spur-gearing this speed of the spindle may be reduced three and one-half times and by another relation of the same it may be again reduced three and one-half times, the clutch-mechanism operating at the fastest speed of the reversing shaft throughout. Each of these three resultants of speed are obtained from the belt-drive, and each may be again subdivided into six further reductions of speed from the speed-box, the mechanism thus providing eighteen spindle-speeds ranging from seven to two hundred and fifty revolutions per minute, although it is obvious that these may be varied or increased or diminished without departing from the spirit of my invention, this exemplification being instanced as an illustration of my invention and its objects and not as a limitation.

My invention consists in improvements for accomplishing these purposes, and in the parts, and in the construction, arrangement and combinations of parts hereinafter more fully described and claimed.

In the drawings: Figure 1 is a side elevation of my improved device. Fig. 2 is a plan view of the same. Fig. 3 is a front elevation of the same, with the lower part broken away. Fig. 4 is a vertical section of the reversing mechanism taken on the line $z$ of Fig. 2. Fig. 5 is a detail of the same in section on the line $y$ of Fig. 4. Fig. 6 is a vertical section of the speed-box taken on the line $x$—$x$ of Fig. 1. Fig. 7 is an enlarged plan view of the spur-gearing at the spindle and showing the manner of mounting the same. Fig. 8 is a vertical section of the same on the line $w$—$w$ of Fig. 7. Fig. 9 is a vertical section of the same on the line $v$—$v$ of Fig. 7; and, Fig. 10 is a detail in rear elevation of the driving connections between the spindle and its feeding means.

1 represents a base from which a main column 2 and a supplemental column 3 extend upwardly, the main column supporting a table-bracket 4 on which a table 5 is mounted, and a drill-arm 6 having a bearing 7 for a longitudinally movable sleeve 8 in which a drill-spindle 9 is journaled and supporting suitable feeding mechanism for feeding the drill. At the top of the main column there is a double arm-bracket 10 having a forwardly extending arm 11 for supporting the spur-gear mechanism and upper journal-support for the drill-spindle, and a rearwardly extending arm 12 which is rigidly secured to the supplemental column as by bolts 13. The double-arm bracket is provided with a bearing received about the upper end of the main column 2. The construction permits the main column 2 to be turned, as on a lathe, prior to being assembled as a part of the main frame, for providing a proper fit thereof in the bearings for the arm 6 and the bracket 4, and provides an economical construction.

15 is a sleeve which turns in a bearing 16 of the arm 11 and to which the drill-spindle is secured against rotative movement by means of the spline 17 in the groove 18 of the drill-spindle, the drill-spindle having longitudinal movement in the sleeve, the sleeve supporting a spur-gear 19 of larger diameter and a spur-gear 20 of smaller diameter.

21 is a swinging frame pivoted on a pin 22 in a bearing 23 on the arm 11.

24 is a stud secured in a bearing 25 on the arm 11, about which a spur-gear 26 of larger diameter, a spur-gear 27 of smaller diameter, and bevel-gear 28 rotate together, the construction showing a sleeve 29 rotatable about the stud, to which sleeve the spur-gear 27 and bevel-gear 28 are secured, the spur-gear 26 being secured to the hub 30 of the bevel-gear.

The swinging frame 21 has a series of studs for suppporting a series of intermediate spur-gears between the spur-gears rotating with the bevel-gear and the spur-gears about the spindle, all of which intermediate gears may be selectively moved into and out of mesh with the spur-gearing at the bevel-gear and at the spindle. Thus a stud 31 is secured in a bearing 32, on which stud an intermediate spur-gear 33 is journaled, this spur-gear meshing with the spur-gear 27 and in turn being capable of meshing with the spur-gear 19. This spur-gear 33 forms one of the series of intermediate gearings. The swinging frame also has a stud 34 secured in a bearing 35 thereof, upon which a gear 36 is journaled, this gear 36 adapted to mesh with the spur-gear 20 and the spur-gear 26, for forming another of the series of intermediate gearings. The swinging-arm further has a stud 37 secured in a bearing 38, on which stud spur-gears 39 40, secured together, are journaled, the spur-gear 39 being arranged to mesh with the spur-gear 27 and the spur-gear 40 being arranged to mesh with the spur-gear 19 for forming a further series of said intermediate gearings. The swinging of the swinging frame is accomplished by means of a lever 44 pivoted at 45 to the swinging frame, the swinging end of the swinging frame being adapted to ride on an arc-piece 46 having holes 47 with which a pin 48 on the arm 44 is adapted to selectively engage for positioning the swinging frame so that any of said series of intermediate gearings may be in engagement for imparting different speeds between the sleeve 29 and the spindle. The spur-gear 33 forms a transmitting gear from the gear 27 to the gear 19 when the intermediate speed is imparted to the spindle, and passes through the space between said gears 27 and 19, when either of the other series of intermediate gearings are caused to be in engagement, as above explained. It will be noted that when the spur-gear 33 is in engagement that the series of gears transmitting motion have their rotary axes in a line with the pivot of the swinging frame, and further that the swinging frame has an opening 49 at the driving gears of the series, the swinging frame surrounding said driving gears. By means of my improved mechanism three spindle speeds are imparted through spur-gearing by the movement of the swinging-frame at the spindle position, thus providing powerful drive at the spindle.

51 is a cross-shaft, which I shall term a reversing shaft, and is journaled in bearings 52 53 respectively on upward extensions 54 55 of the bracket 10. A pair of sleeves 56 57 is secured to this shaft in separated relation, the sleeves having flanges 58 59 at their adjacent ends. Bevel gears 60 and 61 are journaled about these sleeves, being in mesh with the bevel-gear 28, and held against endwise movement by collars 62 63 and the flanges 58 59 received by recesses 64 65 in said pair of bevel-gears. An expanding friction ring 66 is received about each of the said flanges in the said recesses, one end of each ring being rigidly held to its flange by a pin 67, and the other end thereof contacting an abutment 68 of a pin 69 journaled in a bearing 70 of the flange. (See Figs. 4 and 5). Each of the pins 69 has a lever 71 extending therefrom in which there is a set-screw 72 adapted to be contacted by one of the inclined faces 73 of a collar 74 journaled upon the cross-shaft and moved endwise by means of a yoke 75 received in an annular recess 76 of the collar, the yoke 75 being on a shifting-rod 77 which has longitudinal movement in bearings 78 on the extensions 54 55, this longitudinal movement being imparted by an upright rock-shaft 79 journaled in a bearing 80 and a sleeve 81 respectively on the brackets 10 and 6 and having connection with the shifting-rod by means of a yoke-arm 82 having a slot 83 receiving a pin 84 on the shifting-rod, a shifting-handle 85 being secured to the sleeve 81 which moves with the drill-arm, the upright rock-shaft 79 being shown rectangular in cross-section and passing through a similarly shaped bore in the sleeve. Suitable means may be provided for counter-balancing and for raising and lowering this drill-arm, not herein more particularly described because well-known.

91 is a speed-box secured to a shelf 92 on the supplemental column, upon which the speed-box is secured with permission for lateral adjustment by bolts 93 passing through slots 94 in the shelf and into the bottom of the speed-box, for bringing the intermediate pulleys hereinafter described into line with each other. The speed-box preferably comprises a driving-shaft 95 journaled in bearings 96 of the speed-box, on which drive-shaft there is a driving-pulley 97 and gears 98 of different sizes forming a group of diversely-sized gears.

99 is a driven-shaft journaled in bearings 100 of the speed-box, on which driven-shaft there is a transmitting-pulley 101 and a splined sleeve 102 supporting a sliding driven gear 103. A tumbler-lever 104 is on the sleeve and has a transmitting gear 105 journaled thereon, which meshes with the gear 103, the tumbler-lever being arranged to be shifted sidewise so that the driven and transmitting gears may be opposite any one of the group of diversely-sized gears, upon which the tumbler-lever may be moved transversely for causing a pull-pin 106 thereon to enter the proper slot 107 and be received by the proper hole 108 on the front 109 of the speed-box for causing meshing between the desired gear of the group of diversely-sized gears and the intermediate gear.

The driven-shaft extends inwardly from the supplemental column, and the transmitting-pulley 101 is received by the space 110 between the supplemental column and the main column, a transmitting-belt 111 passing through said space from the transmitting-pulley 101 over a transmitting-pulley 112 on the reversing shaft, by which means compact and strong construction is obtained, and a large variety of spindle speeds are obtained by means of spur-gearing adjacent the spindle providing strong drive and large reductions in speed at the spindle, which large reductions are further divided by means of an initial speed-box, the reversing gearing and a yielding driving connection being in advance of the spindle spur-gearing and between the latter and the initial speed-box for the purposes stated.

Positive means are provided for driving the spindle feed from the spindle, so that definite relation of spindle feed to spindle speed may be maintained.

115 is a pinion on the spindle which meshes with a gear 116 having a spline 117 received by a groove 118 of the longitudinally movable shaft 119 which has a key 120 thereon.

121 is a cone of gears, the gears of which are loose on the shaft 119, any one of which may be rotatively secured to the shaft by the key 120. The shaft 119 is moved longitudinally by a lever 122 articulated therewith at 123 and pivoted to a leaf 124 which has holes 125 therein for receiving a pin 126 on the lever for positioning the lever.

127 is a cone of gears secured to a sleeve 128 journaled in bearings 129 at the outer end of the arm 11, a feed-shaft 130 being splined to and movable lengthwise in the sleeve, the lower end of the feed-shaft being journaled in a bearing 131 and carrying a gear 132 transmitting motion to a worm 133 through a gear 134, the worm meshing a worm-wheel 135 on a shaft 136 carrying a pinion engaging a rack 138 on the sleeve 8.

What I claim as new and desire to secure by Letters Patent is:

1. The combination of a base, a main column and a supplemental column extending upwardly from said base and spaced apart, a double-arm bracket at the upper end of said main column having oppositely extending arms one of which connects said columns, a bearing on said bracket at the inner end of said last-named arm and a bearing at the outer end of the other of said arms, a cross-shaft journaled in said bearings having an overhanging end above the space between said columns, a casing for variable gearing on said supplemental column, variable gearing comprising a driven shaft journaled in said casing and having an overhanging end, the said overhanging ends of said shafts extending in opposite directions, pulleys on said overhanging ends, and a belt passing through said space between said columns and about said pulleys.

2. The combination of a base, a main column and a supplemental column extending upwardly from said base and spaced apart, a double-arm bracket at the upper end of said main column one arm whereof connects said columns, a cross-shaft journaled in said bracket, a casing on said supplemental column, variable speed mechanism mounted on said casing, a pulley on said cross-shaft above the space between said columns, said variable speed mechanism embracing a pulley at said space, a belt passing through said space about said pulleys, and means for lateral adjustment of said casing on said supplemental column and for securing said casing in adjusted positions for alining said pulleys.

3. The combination of a rotatable member, spur-gearing having coincident axis therewith, stationarily positioned spur-gearing, a movable frame, and transmitting gearing journaled thereon at three positions and moving therewith, the said transmitting gearing at the intermediate position meshing with said first-named spur-gearing and said stationarily positioned spur-gearing and passing out of mesh therebetween in both directions by movement of said movable frame, said gearings being located in three tiers, substantially as described.

4. The combination of a rotatable member, spur-gearing having coincident axis therewith, stationarily positioned spur-gearing, a pivoted frame, transmitting gearing journaled thereon at three positions and moving therewith, the said transmitting gearing at the intermediate position meshing with said first-named spur-gearing and said stationarily positioned spur-gearing and passing out of mesh therebetween in both directions by movement of said pivoted frame, an arc-piece on which the swinging end of said pivoted frame has bearing, and a shifting-lever pivoted to said pivoted frame, said arc-piece and shifting-lever having positioning means therebetween for determining the positions of engagement of said transmitting gearing, said gearings being located in three tiers, substantially as described.

5. The combination of a rotatable member, spur-gearing having coincident axis therewith, stationarily positioned spur-gearing, said first-named spur-gearing and said last-named spur-gearing having space therebetween, a movable frame, transmitting gearing at more than two positions on said frame, the transmitting gearing at one of said positions movable through said space, said gearings being located in three tiers, substantially as described.

6. The combination of a rotatable member, spur-gearing having coincident axis therewith, stationarily positioned spur-gearing, said first-named spur-gearing and said last-named spur-gearing having space therebetween, a movable frame, said movable frame having an opening surrounding said second-named spur-gearing, transmitting gearing at three positions on said frame, the transmitting gearing at one of said positions movable through said space, and the transmitting gearing at two of said positions being single gears, substantially as described.

7. The combination of a main column, an arm slidable thereon, a supplemental column, a variable speed mechanism thereon, a double-arm bracket at the upper end of said column connected with both of said columns and forming a space between said columns, a rotatable member journaled in said arm and upper bracket, spur-gearing on said upper bracket and said rotatable member for driving the same, a movable frame pivoted to said upper-bracket, a series of spur-gears thereon coacting with said first-named spur-gearing for driving said rotatable member at various speeds, and reversing mechanism and a driving connection between said last-named gearing and said variable speed mechanism, substantially as described.

8. The combination of a column, an arm thereon, a bracket at the upper end of said column, a rotatable member having journal connection with said bracket and said arm, a pair of spur-gears through which said rotatable member slides and to which it is rotatably secured, a pair of gears journaled on said bracket having coincident axes, a frame pivoted to said bracket, and spur-gears journaled thereon at three different positions, the gearing at one of said positions being adapted to engage both said pairs of gears and pass therebetween in either direction for permitting the gearing in said other positions to engage with said pairs of gear for imparting three several speeds to said rotatable member in the same direction, substantially as described.

9. The combination of a column, an arm thereon, a bracket at the upper end of said column, a rotatable member having journal connection with said bracket and said arm, a pair of spur-gears through which said rotatable member slides and to which it is rotatably secured, a pair of gears journaled on said bracket having coincident axes, a frame pivoted to said bracket and spur-gears journaled thereon at three different positions, the gearing at one of said positions being adapted to engage both said pairs of gears and pass therebetween in either direction for permitting the gearing in said other positions to engage with said pairs of gears for imparting three several speeds to said rotatable member in the same direction, a bevel-gear secured to said second-named pair of gears, a pair of bevel-gears in mesh with the latter, a reversing-shaft and clutch-mechanism for causing either of said last-named bevel-gears to be temporarily secured to said shaft for respectively rotating said first-named bevel-gear in either direction for imparting reverse motions to said rotatable member at any of said speeds, substantially as described.

In testimony whereof I have subscribed my name hereto in the presence of two subscribing witnesses.

ANTON MILL.

Witnesses:
EDWARD SOUTHWORTH,
LILLIAN BURNETT.

---

Copies of this patent may be obtained for five cents each, by addressing the "Commissioner of Patents, Washington, D. C."